March 17, 1970     W. BARDFELD     3,500,669
SHIFTING DEVICES
Filed July 27, 1967     2 Sheets-Sheet 1
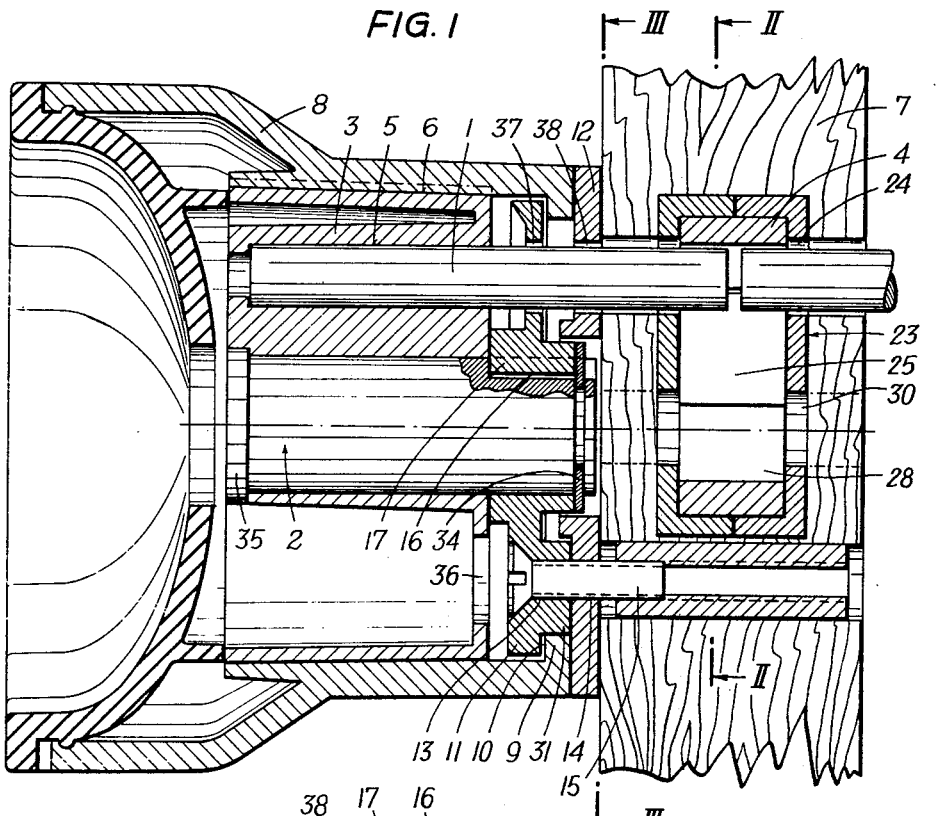
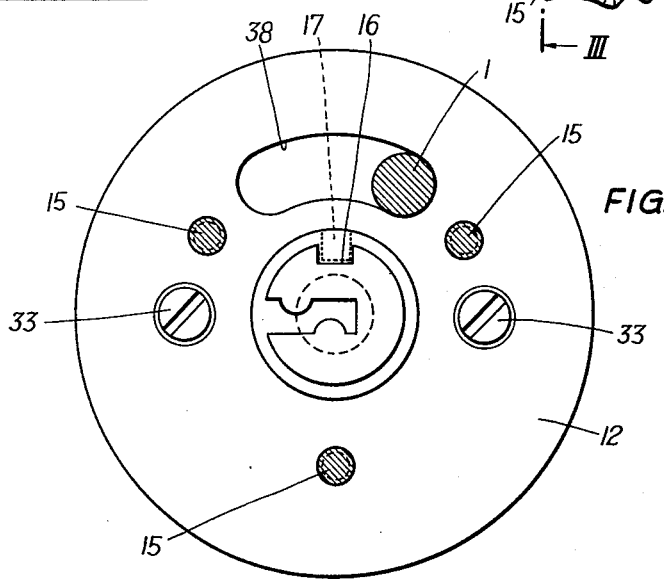

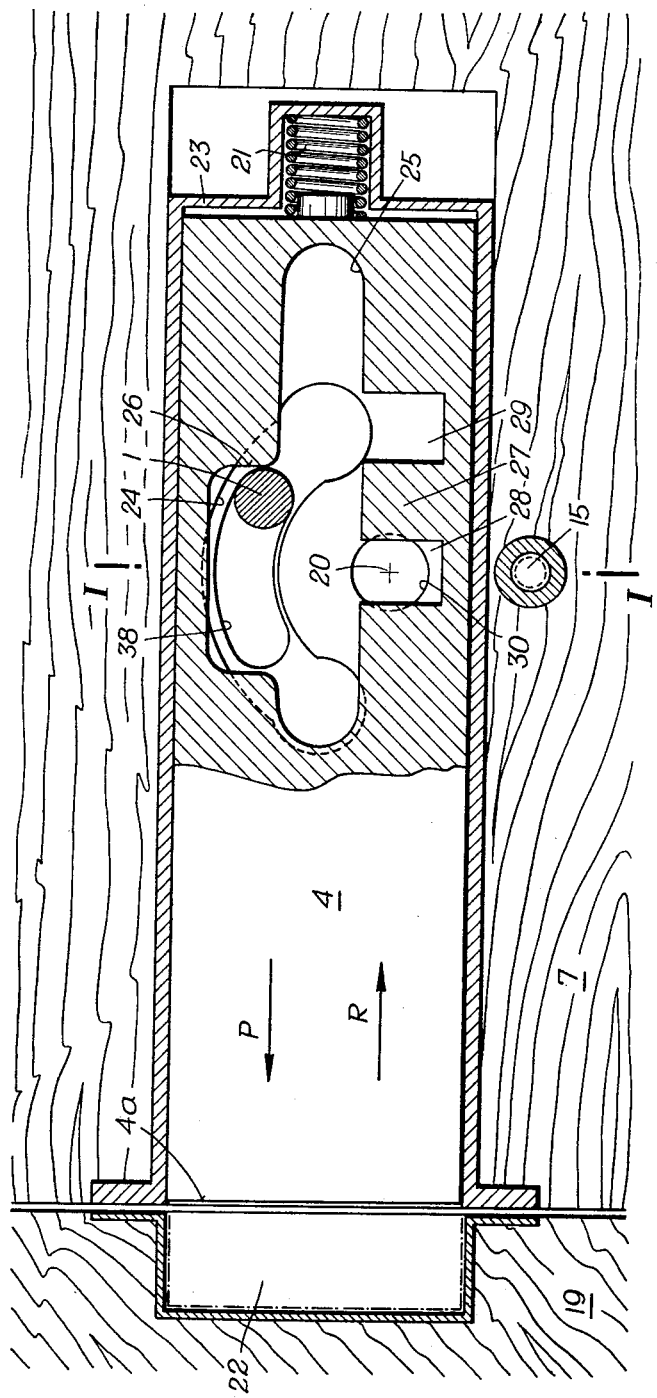

United States Patent Office 3,500,669
Patented Mar. 17, 1970

3,500,669
SHIFTING DEVICES
Wilhelm Bardfeld, Loeschenkohlgasse 8,
Vienna 15, Austria
Filed July 27, 1967, Ser. No. 656,587
Int. Cl. E05b 65/06
U.S. Cl. 70—216                                2 Claims

ABSTRACT OF THE DISCLOSURE

A shifting device for the actuator of a member to be shifted, which is adapted to be blocked by means of a cylindrical lock, the core cylinder of which is mounted in a casing in such a manner that the core cylinder casing is connected to the actuator so as to be rotatable relatively to the core cylinder, which is fixed, and is then locked in one or more positions by means of locking pins.

---

This invention relates to a shifting device for the actuator of a member to be shifted, which is adapted to be blocked by means of a cylindrical lock, the core cylinder of which is mounted in a casing, core cylinder and casing being rotatable relatively to one another and capable of being locked relatively to one another in one or more positions by means of locking pins which pass through the gap between the core cylinder and the casing.

In shifting devices of this kind it is known to have the casing fixed and to rotate the core for the purpose of shifting the actuator. The entire torque is then initiated in the core and transmitted from the core to the actuator by the relatively thin key, the cross-section of which is weakened by notches. The key is under relatively high torsional stress, because its cross-section is small and moreover weakened by the notches already mentioned, so that the resistance moment is relatively low. The known shifting devices are thus unfavourable particularly as regards the stressing of the key.

These disadvantages are avoided, however, if according to the invention the core cylinder is fixed and the core cylinder casing is connected to the actuator and is rotatable relatively to the core cylinder. In the shifting arrangement designed according to the invention, the torque for shifting the actuator is initiated in the casing and thence transmitted to the actuator, whereby the key which is introduced into the core cylinder, is not subjected to any stress during the shifting operation. The shifting device according to the invention and also the key may therefore be made of relatively cheap materials, e.g. of plastics. The danger of the key introduced into the core cylinder breaking during the shifting operation and of the lock only being able to be locked after removal of the remains of the old key and introduction of new key, is not present in the shifting device according to the invention.

It is also advantageous if the invention is applied to a locking mechanism for doors particularly those equipped with self-locking devices, wherein the actuating member is adapted to be brought into engagement with the locking mechanism latch constituting the member to be shifted. In this case, according to the invention, the core cylinder casing is mounted in a recess in a turning knob adapted to be fixed to the door, the actuating member being designed as a pin inserted in a bore in the core cylinder casing.

The invention is described in more detail with reference to one embodiment illustrated in the accompanying drawing, in which:

FIGURE 1 is a section through the device according to the invention along the line I—I of FIGURE 2, the device according to the invention being fixed to a door and adapted to actuate a latch.

FIGURE 2 is a section along the line II—II of FIGURE 1.

FIGURE 3 is a section along the line III—III of FIGURE 1.

In the drawings, 1 is the actuating member for the member to be shifted, which in the example illustrated is the latch 4 of a locking mechanism in a door 7 provided for example with a self-closing device. The actuating member 1 is adapted to be locked by a cylinder lock the core cylinder 2 of which is mounted in a casing 3 connected to the actuating member 1. The core cylinder 2 of the cylinder lock is fixed. If a key is inserted in the core cylinder 2, the closing pins (not illustrated) which pass through the gap between core cylinder casing 3 and the core cylinder 2, are displaced radially with respect to the core cylinder 2 and the core cylinder casing 3 can be rotated about the core cylinder 2. The actuating member 1 which is connected to the core cylinder casing 3, participates in this rotation and engages in a recess 25 in the latch 4.

In the retracted position of the latch 4 drawn in FIGURE 2, the latch is retained through bearing of the actuating member 1 on the wall 26 of the recess 25 and is pressed by a spring 21 against the actuating member 1 which spring bears at one end on the latch 4 and a the other on a latch casing 23 inserted in the door 7. The latch casing 23 is provided on its side walls with substantially arcuate openings 24 for passage of the actuating member 1. Naturally the door 7 also has a corresponding opening for passage of the actuating member 1. The centres of curvature of the arcuate openings are located in the axis 20 of the core cylinder 2.

If in the position shown in FIGURE 2, the key is withdrawn from the core cylinder 2, the casing and with i the actuating member 1 is locked in the position illustrated and the latch 4 is retained in the retracted position The actuating member 1 can, however, if the locking action is released after insertion of the key, be rotated against the clockwise direction of FIGURE 2 either under the action of the spring 21 or under that of a further torsion spring, not shown. The latch is then displaced in the direction of the arrow P and when the door is closed engages in a recess 22 in the jamb 19. The door 7 is then closed relatively to the jamb 19 and, if the key is withdrawn from the core cylinder as above, also locked.

If the door is open, however, and the actuating membe is rotated against the clockwise direction of FIGURE 2 under the action of the above mentioned torsion spring the front end 4a of the latch projects from the door 7 The front end 4a of the latch 4 is bevelled in a wedge shaped manner. If the door 7 is shut, or closed by a door-closing device, the wedge-shaped end 4a of the latch 4 comes to bear on the jamb 19, so that by the action of the wedge-shaped end 4a, the latch 4 is inserted against the action of the spring 21 in the direction o the arrow R into the latch casing 23. As soon as the latch 4, on further movement of the door into the closing position, comes into alignment with the recess 22 in the jamb 19, the latch snaps in the direction of the arrow 1 into the recess 22 in the jamb 19 and the door 7 is closed and, after withdrawal of the key, locked.

The latch is further, as shown in FIGURE 2, provided with two openings 28, 29 separated by a bridge 27 which on movement of the latch 4, come opposite a circula or otherwise shaped hole 30 in the side wall of the latch casing 23. If the core cylinder 2 is replaced by a locking bolt, not shown, which is adapted to be displaced in the direction of the axis 20 and can engage with its from end in the hole 30 and the opening 28 or 29 at that time cated in front of the hole, it is possible to lock the tch 4 in the open and in the closed position. This is a embodiment which is preferably used in bathroom and /.C. doors. In this case it is also possible to indicate to the outside by means of the locking bolt, possibly by red and green signals, whether the room is "vacant" or engaged."

The actuating member 1 is designed as a pin and is inserted in a bore 5 in the core cylinder casing 3. The core cylinder casing is mounted in a recess 6 in a turning knob 8 fixed to the door 7 and connected to the knob in rotating-locking manner. At the end of the recess 6 the turning knob 8 is provided with an inwardly projecting flange 9, which engages with play in a groove 10, which is bounded by two discs 11, 12 arranged coaxially to one another. The discs 11, 12 thus form the bearing for the turning knob 8. The disc has a centering projection 1 extending in the axial direction, the thickness of which coincides with the thickness of the flange 9 of the knob 8. By the end face of the centering projection 31 the disc 1 bears on the disc 12. The discs 11 and 12 can then, after the disc 11 has been inserted in the recess 6 of the knob 8, be connected to one another, for example by means of two screws 32, 33 (FIGURE 3). The unit thus formed can then be mounted on the door 7 by means of fixing screws 15. The fixing screws 15 are taken through holes 13 and 14 in the discs 11, 12.

The core cylinder 2 is connected in a rotation-locking manner to the disc 11 by means of a groove-spring connection 16, 17 or in another manner and prevented from being pulled out in the direction of the axis 20 by a clamping ring 34, which bears against the disc 11 and engages in an annular groove in the core cylinder 2. As the disc 11, to which the core cylinder is connected in rotation-locking manner, is fixed to the door, the core cylinder is secured against rotation.

The core cylinder casing 3 bears in the axial direction on a flange 35 on the core cylinder 2 and has holes 36, through which the fixing screws 15 are introduced into the holes 13, 14 in the discs 11 and 12 and can be fixed to the door by means of a screw-driver. As the core cylinder casing 3 is rotated relatively to the discs 11, 12 fixed to the door, the holes 36 are in alignment with the holes 13, 14 in the discs 11, 12 only in one position of the core cylinder casing 3, so that the screws 15 are accessible only in one position of the core cylinder casing 3. This position is preferably so selected that the fixing screws are not accessible from the outside either in the closed or in the open position of the latch 4. This provides security against opening of the catch by taking apart the entire locking mechanism.

The discs 11 and 12 are provided with arcuate, flush recesses 37 and 38 for passage of the actuating member 1. The arrangement of the recess 38 in relation to the holes 14 in the disc 12 can be seen in FIGURE 3. In similar manner the recess 37 is arranged in the disc 11 in relation to its holes 13.

The shifting device according to the invention may also be applied to locks which are provided with a latch and bolt, if instead of the door handle, the shifting mechanism according to the invention is connected to the latch. In this way double security is obtained, as the door can be locked both by means of the bolt and also by means of the shifting device according to the invention.

Through the feature that it is possible in the shifting device according to the invention to provide a number of locking positions, as opposed to a normal lock, which has only one or two locking positions, the shifting device according to the invention may also be used as a safety lock. The finding of the "correct" locking position is difficult for unauthorised persons.

The shifting device may also be opened by remote control, if an excitable magnet or other device is incorporated at one end, for example of the latch casing 23 or at another point.

I claim:

1. A locking door handle comprising an outer knob having an axis of rotation, means defining a recess in said knob, a core housing in said recess non-elastically connected to said knob for rotation therewith about said axis, an actuating member carried by said core housing for operating a door latch by rotation of the knob and core housing about said axis, wall means defining a bore in said core housing coaxial with said axis, a nonrotary core cylinder fitting in said bore for attachment to a door, key-operated means in said cylinder acting directly between said cylinder and said housing to releasably lock said housing and said knob to said cylinder and prevent rotation of said knob and said housing, said outer knob having a terminal radially inwardly projecting flange, a pair of discs, means for attaching said discs to a door, said discs defining a groove therebetween to accept said flange, and said discs providing bearing surfaces for said knob.

2. The door handle of claim 1 including an annular spring carried by said cylinder and connecting said cylinder to one of said discs and a key between said one of said discs and said cylinder for preventing rotation of said cylinder relative to said disc about said axis.

References Cited

UNITED STATES PATENTS 3,326,024  6/1967  Dreyfus et al. _____ 70—351

MARVIN A. CHAMPION, Primary Examiner

ROBERT L. WOLFE, Assistant Examiner

U.S. Cl. X.R.

70—146, 387